(12) United States Patent
Motoyoshi et al.

(10) Patent No.: US 7,612,599 B2
(45) Date of Patent: Nov. 3, 2009

(54) SEMICONDUCTOR DEVICE

(75) Inventors: Minoru Motoyoshi, Ome (JP);
Yasuhiro Fujimura, Hamura (JP);
Shigeru Nakahara, Higashiyamato (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/167,233

(22) Filed: Jul. 2, 2008

(65) Prior Publication Data
US 2009/0079488 A1    Mar. 26, 2009

(30) Foreign Application Priority Data
Sep. 21, 2007   (JP)   ............... 2007-244646

(51) Int. Cl.
*H03K 3/00*   (2006.01)
(52) U.S. Cl. ................. 327/295; 327/565; 365/189.08
(58) Field of Classification Search ............... None
See application file for complete search history.

(56) References Cited

U.S. PATENT DOCUMENTS 6,538,489 B2 * 3/2003 Nakano ............. 327/297
6,559,701 B1 * 5/2003 Dillon ............... 327/293

FOREIGN PATENT DOCUMENTS

| JP | 05-073167 A | 3/1993 |
|----|-------------|--------|
| JP | 05-259414 A | 10/1993 |
| JP | 06-260555 A | 9/1994 |

* cited by examiner

*Primary Examiner*—An T Luu
(74) *Attorney, Agent, or Firm*—Miles & Stockbridge P.C.

(57) ABSTRACT

Clock skew can be reduced by suppressing fluctuation in wiring leads between the final stage clock buffers and the clock distribution circuit for supplying the clock. In view of attaining such reduction of clock skew, an upstream of the clock distribution circuit is formed in an H tree structure and the final stage is formed in a local fishbone structure. A plurality of main clock lines connected to the final stage buffer include a first main clock line and a second main clock line. The number of cell arrangement allowable rows where a plurality of first flip-flops for receiving the clock from the first main clock line are located is different from the number of cell arrangement allowable rows where a plurality first flip-flops for receiving the clock from the second main clock line are located.

10 Claims, 9 Drawing Sheets

□: FLIP-FLOP

SEMICONDUCTOR DEVICE

CLAIM OF PRIORITY

The present application claims priority from Japanese patent application JP 2007-244646 filed on Sep. 21, 2007, the content of which is hereby incorporated by reference into this application.

FIELD OF THE INVENTION

The present invention relates to a semiconductor device and more particularly to a semiconductor device including a clock distribution circuit with less step-out of synchronization of a clock signal and also provide a method of designing the same semiconductor device.

BACKGROUND OF THE INVENTION

In a large scale semiconductor integrated circuit (hereinafter, referred to as LSI) including a sequential circuit that is operated synchronously with a clock signal, step-out of synchronization of the clock signal (hereinafter, referred to as clock skew) generated by distribution of the clock is considered as a factor for lowering in direct the operation frequency of LSI. With improvement in operation rate of LSI, reduction of clock skew is necessary for realization of high-speed operation of LSI.

Several circuit formats are known as a clock distribution circuit. FIG. 1 shows an H-tree type clock distribution circuit. A tree-type clock distribution represented by the H-tree is known as the circuit to theoretically realize clock skew 0 under the condition that a clock buffer load of each stage is perfectly equalized. However, in actual, it is difficult to realize uniform design of the tree-structure type clocks for all clock synchronization circuits and a clock skew is generated in accordance with fluctuation in the clock buffer driving force and parasitic element of wiring.

Here, it is explained here that the patent documents 1 to 3 (JP-A-Hei6(1994)-260555, JP-A-Hei5(1993)-259414, and JP-A-Hei5(1993)-73167) have been found by searching the related arts from the viewpoint of fishbone clock tree that is realized by arranging in vertical the final stage buffers after the present invention has been obtained. However, in each patent document, the final stage buffers are regularly arranged corresponding to the allowable arrangement of cells.

SUMMARY OF THE INVENTION

Since it is difficult to uniformly design a tree structure type clocks for all clock distribution circuits, a semiconductor chip is divided into a plurality of regions and implementation of clock distribution by an H-tree. In an example of FIG. 1, the semiconductor chip is divided into regions of 4×4 and the H tree is formed of an initial stage clock driver 102, second stage clock drivers 103, and third stage clock drivers 104. In this case, the third stage clock driver is provided as the final stage clock driver. Each final stage clock driver 104-1 supplies the clock to a flip-flop located at the corresponding region (service area) 105-1.

Clock distribution in LSI is generally designed on the basis of the automatic layout of wiring (CTS: Clock Tree Synthesys). In this CTS method, a computer determines wiring routes to provide the minimum clock skew within the range up to a flip-flop 200 to which the clock is distributed from a clock driver, considering wiring length, resistance, and capacitance. The clock tree generated in this method is called a routed tree. However, in the clock distribution system based on this routed tree system, a wiring extended using a detour in the periphery of a region is sometimes selected in CTS in the case where too many flip-flops 200 to which the clock is distributed are provided in the region 105 and under the condition that the flip-flop 200 is provided to the entire part of the region. Meanwhile, a length of virtual wire used for estimation of the clock skew in the design stage is often calculated depending on Manhattan length of clock driver and flop-flop. Moreover, in this case, an actual length of wire determined by CTS becomes remarkably longer than the virtual length of wire, and it will likely result in a design failure. Or, it is also considered to introduce a method to minimize clock skew by using a clock wire of mesh structure (FIG. 2B) The mesh structure will require a large amount of power consumption because an amount of wires increase. Moreover, it has also been considered as a problem that wiring for ordinary signals becomes difficult.

A typical example of the present invention will be explained below. A semiconductor device is formed of a plurality of metal wiring layers, provided with a clock distribution circuit including a plurality of main clock lines connected an any buffer of a plurality of buffers and a plurality of final stage buffers constituting the final stage clock buffer and a plurality of flip-flops for receiving the clock from any of the plurality of main clock lines. In this semiconductor device, the plurality of main clock lines are extended in a first direction, the first direction is identical to the direction where a main power supply line of the lowest layer formed in the metal wiring layer is extended, a cell arrangement allowable row is defined with the adjacent main power supply line, the plurality of main clock lines include a first main clock line and a second main clock line, and the number of cell arrangement allowable rows where the plurality of first flip-flops for receiving the clock from the first main clock line are located is different from the number of cell arrangement allowable rows where the plurality of the second flip-flops for receiving the clock from the second main clock line are located.

Clock skew of the clock supplied with the clock distribution circuit is reduced.

DETAILED DESCRIPTION OF THE PREFERRED EMBODIMENT

Figure 1:
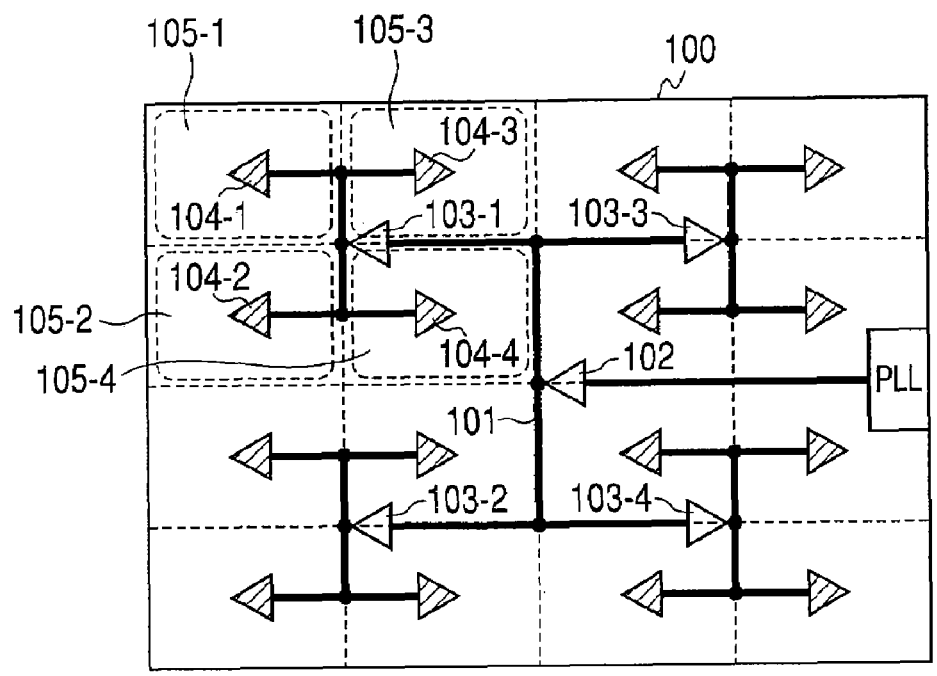
FIG. 1 shows a clock distribution circuit of an H-tree structure.
Figure 2A:
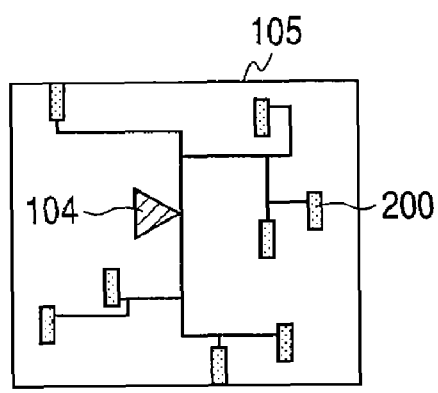
FIG. 2A shows a clock distribution system from the final stage clock buffer using a routed tree.
Figure 2B:
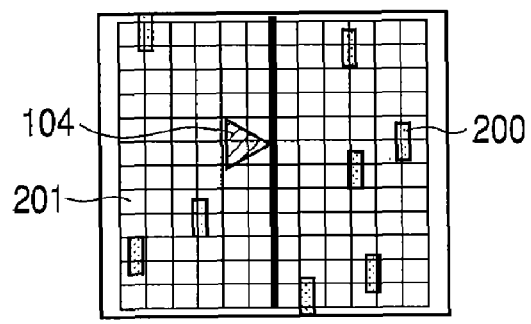
FIG. 2B shows a clock distribution system from the final stage clock buffer using a mesh.
Figure 3:
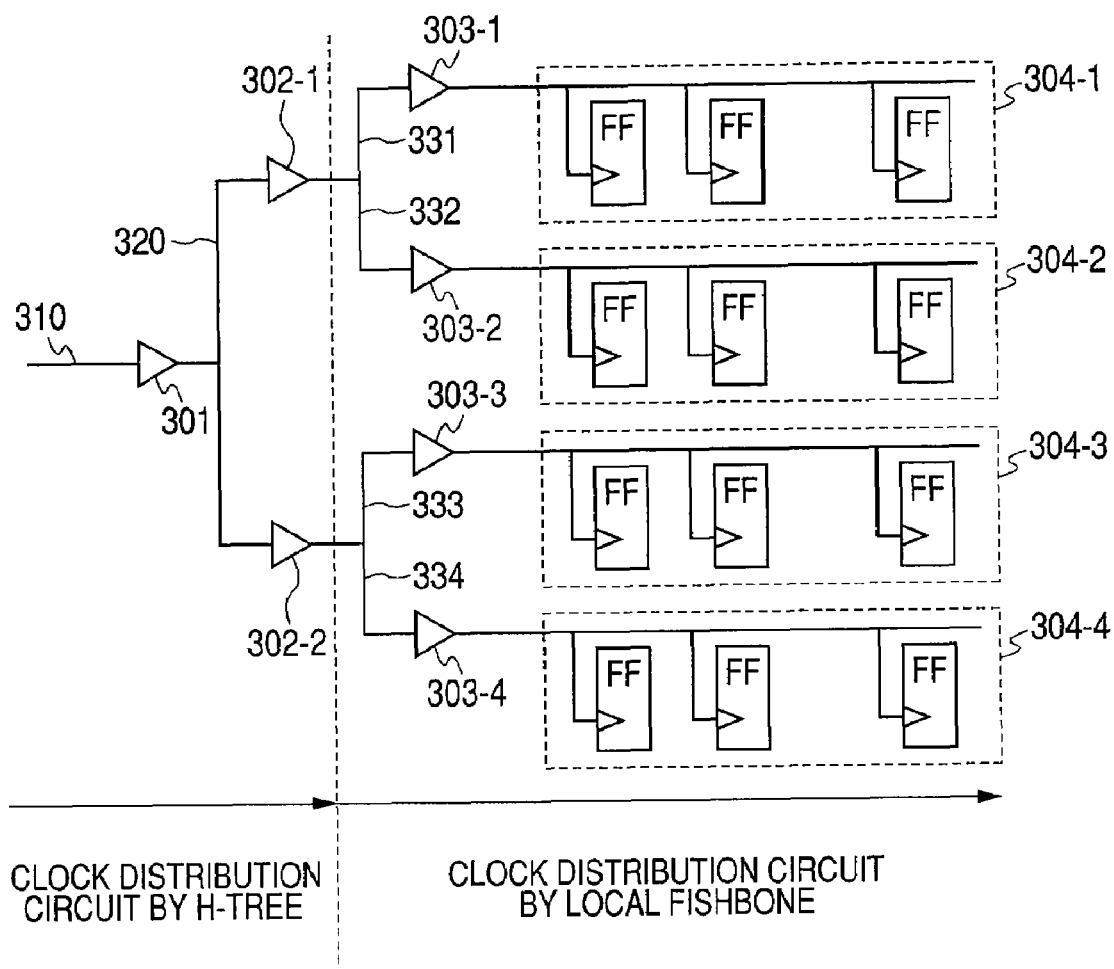
FIG. 3 shows a structure of a clock distribution circuit of the present invention.

A preferred embodiment of the present invention will be explained in detail with reference to the accompanying drawings. As shown in FIG. 3, in the present invention, clock distribution is conducted with an H tree and the final stage clock buffer 303 conducts clock distribution with a local fishbone structure in the upstream side (up to the clock buffer 302) of the clock distribution circuit. The final stage clock buffer 303-1 supplies the clock to the flip-flop FF located at the corresponding region (service area) 304-1.

Figure 4:
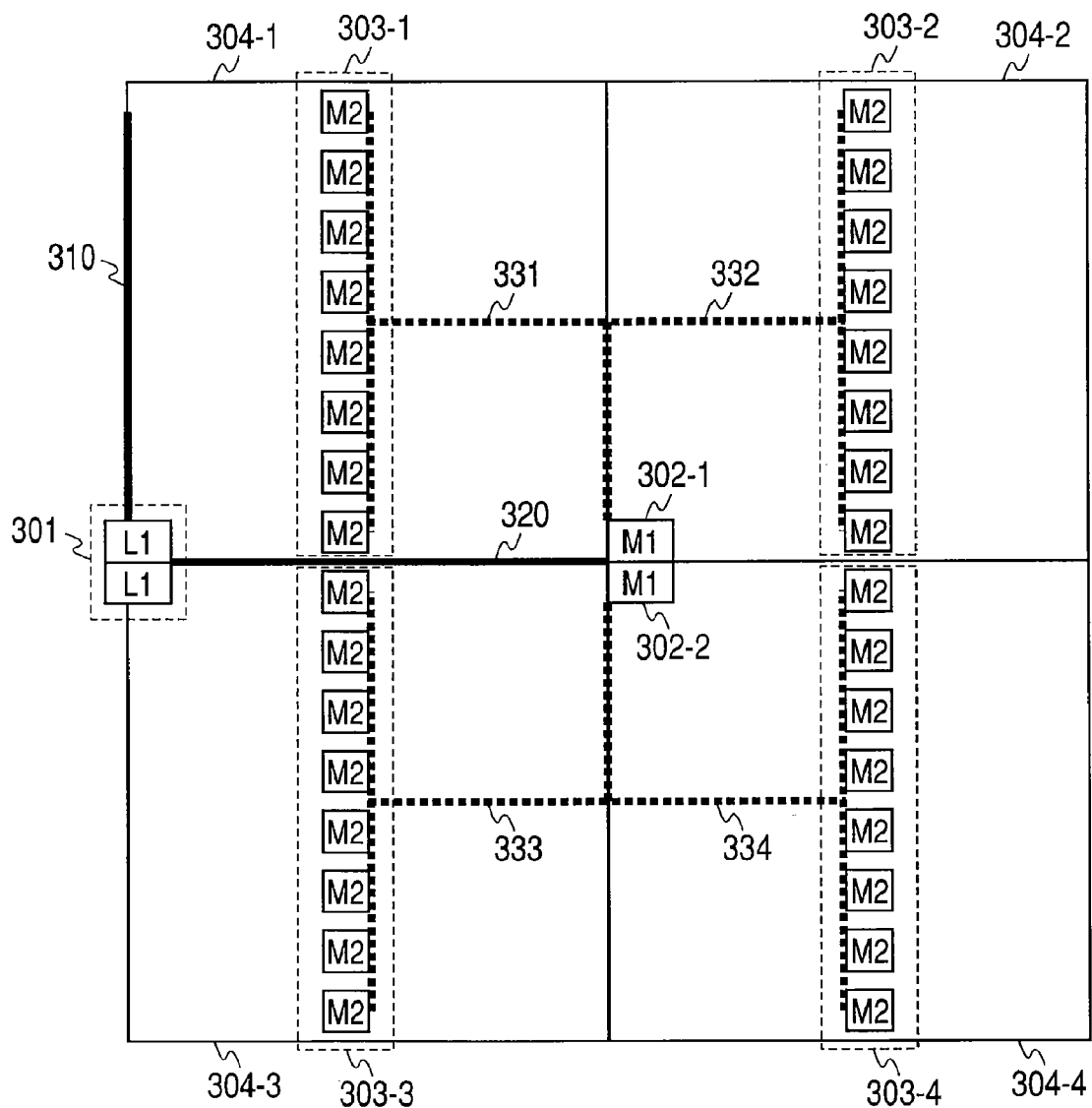
FIG. 4 shows an initial arrangement in the design of the clock distribution circuit of the present invention.

An arrangement and wiring method of the final stage clock buffer 303 will be explained below. FIG. 4 shows the initial state of a layout of the clock distribution circuit of FIG. 3. The block buffers of the H tree structure are arranged up to the clock buffer 302 of the pre-final stage. Moreover, it is desirable for the clock wire to provide a shield wire in both sides of the clock wire in order to prevent influence from the other signal lines.

As shown in FIG. 4, the final stage clock buffer 303-1 is respectively constituted with a plurality of sub-blocks M2 in the initial arrangement and the sub-blocks M2 are equivalently arranged in the vertical direction within each service area 303. In the case where the sub-block M2 is equivalently arranged as shown in FIG. 4 in the initial arrangement as the final stage clock buffer 303-1, even if the corresponding service area 304-1 is completely filled with the flip-flops, a driving capability of the clock buffer constituting the sub-block M2 is predetermined to realize supply. It is of course possible to determine the standard of driving capability of the sub-block M2 based on the other standard.

In the layout process, arrangement of all clock buffers including the final stage clock buffer and clock wiring up to the clock buffer 302 of the pre-final stage are conducted in the step before the automatic arrangement, but the clock wirings 331 to 334 between the clock buffer 302 just preceding the final stage and the final stage clock buffer 303. Arrangement of the sub-block M2 forming the final stage clock buffer 303 and wiring between the sub-block M2 and flip-flop are conducted by implementing the automatic arrangement process when arrangement of flip-flop is determined. Thereafter, wiring between the sub-block M2 and the sub-block M1 forming the clock buffer 302 just preceding the final stage is conducted. For the clock wiring between the sub-block M1 and the sub-block M2, it is desirable to provide a shield wire in both sides of the clock wire in order to prevent influence from the other signal lines.

Figure 5:
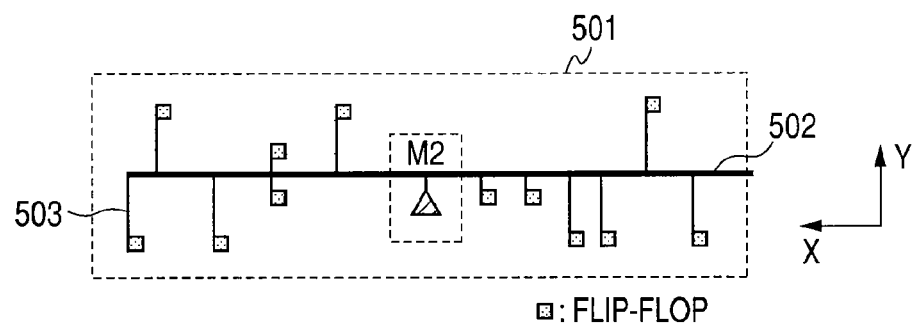
FIG. 5 shows a main local fishbone line of the present invention.

Wiring between the sub-block M2 and the flip-flop is conducted to form a local fishbone structure. Here, a local fishbone structure is shown in FIG. 5 wherein the main clock line 502 in the X direction is arranged located at the gravity point of distribution in the Y direction of the flip-flop (flip-flop included in the region 501) connected to the final stage clock buffer M2 and the main clock line 502 is connected to the flip-flop with the wire 503 orthogonal to the main clock line 502. In this local fishbone structure, generation of design failure resulting from isolation between virtual wire length and the actual wire length can be suppressed, because the clock buffer driving force and an error between delays by wire and load calculated considering the Manhattan distance between the clock buffer and flip-flop as virtual wiring length and delays by wire and load after the actual wiring is minimized.

Figure 6:
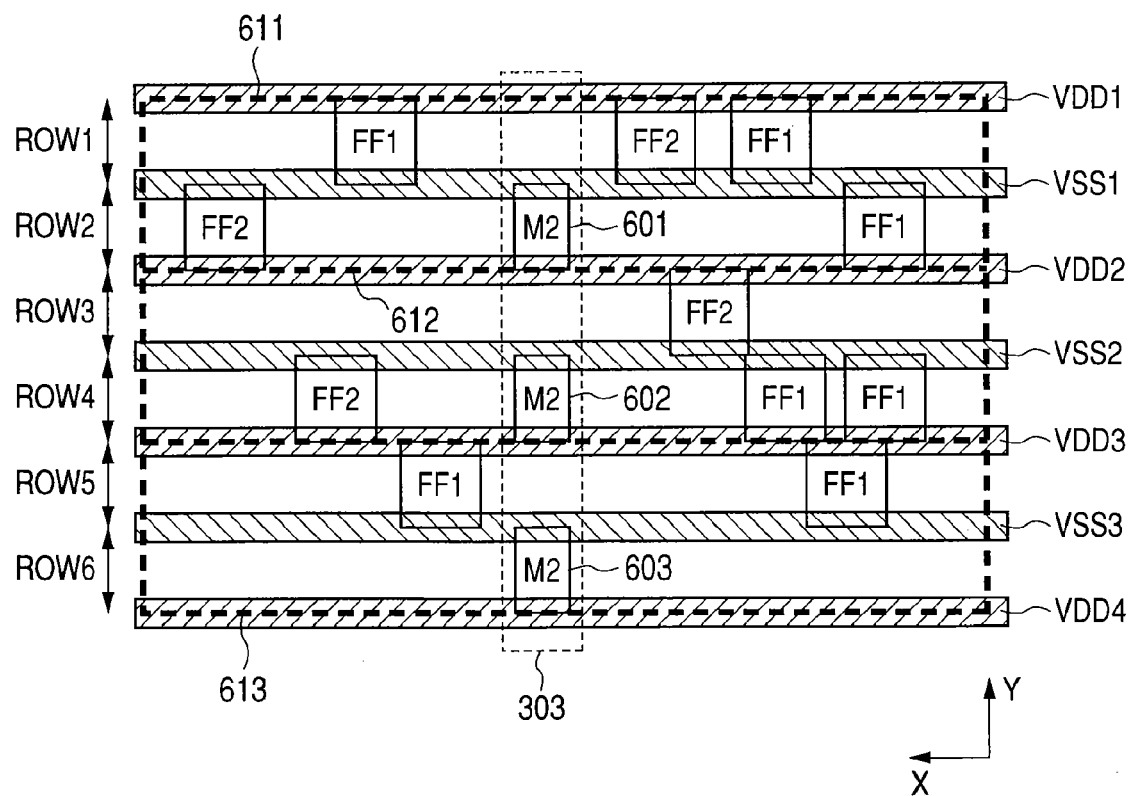
FIG. 6 shows a standard cell arrangement corresponding to a state of the initial arrangement shown in FIG. 4.

FIG. 6 shows a standard cell arrangement of a service area near the sub-block M2 located by automatic arrangement. However, only the sub-block M and the flip-flop FF1, FF2 are shown as the cells and various cells to be arranged are not shown. The main power supply lines (metal wiring) VDD1 to 4/VSS1 to 3 indicate the main power supply lines at the lowest layer. Regions provided between adjacent main power supply line VDD (high potential side main power supply line) and main power supply line VSS (low potential side main power supply line) are designated as the cell arrangement allowable rows ROW 1 to 6. The cell is arranged in this cell arrangement allowable row ROW.

In the initial arrangement, the sub-block M2 is arranged in every other two ROWs (ROW2, ROW4, ROW6 in the example of the figure). Moreover, in the example of FIG. 6, the flip-flop FF1 operated with the clock CK1 and the flip-flop FF2 operated with the clock CK2 are provided simultaneously, assuming that the clocks of two systems are used. In the case where the clocks of two systems are used as explained above, the clock buffer forming the clock distribution circuit in the upstream side (namely, constituted with the H tree) is divided into the clock buffer for driving the clock CK1 and the clock buffer for driving the clock CK2, respectively and these corresponding clock buffers are connected. Meanwhile, in this initial arrangement, it is not determined which sub-block M2 drives which clock. This sub-block M2 is assumed to be constituted with a plurality of buffer groups having lower driving capability as the actual circuit. Following explanation will be based on that the sub-block M2 is constituted with a couple of buffers.

Figure 7:
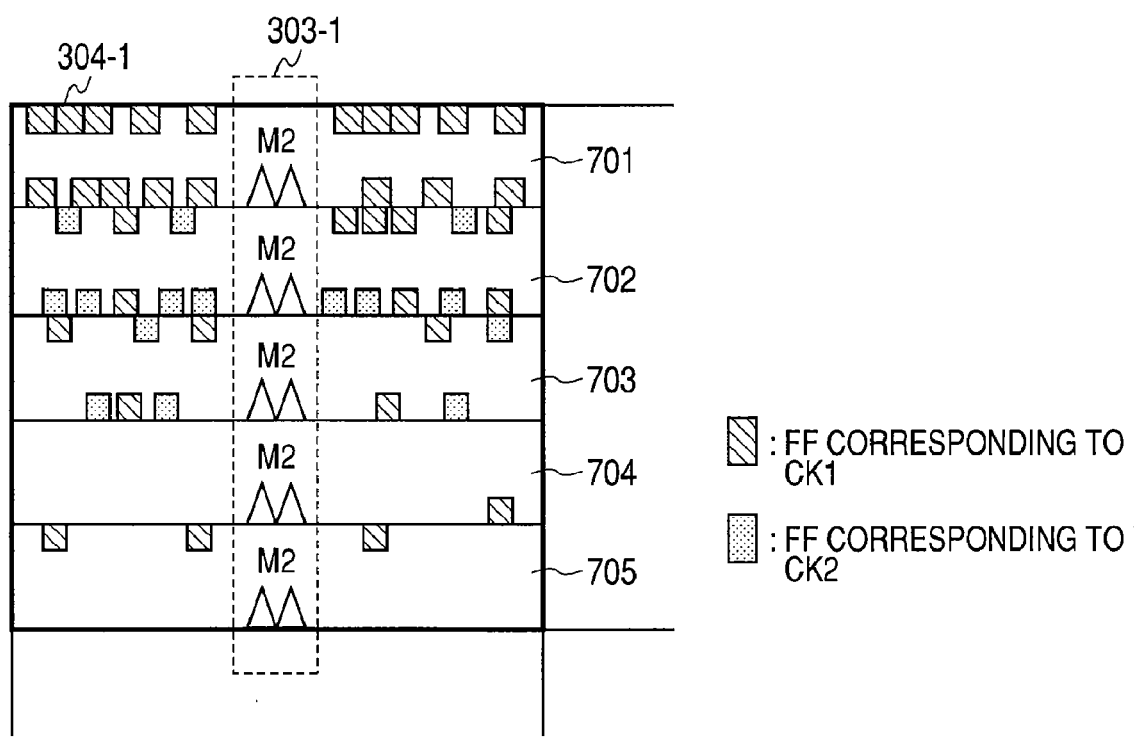
FIG. 7 shows a state after automatic arrangement of flip-flops.
Figure 8:
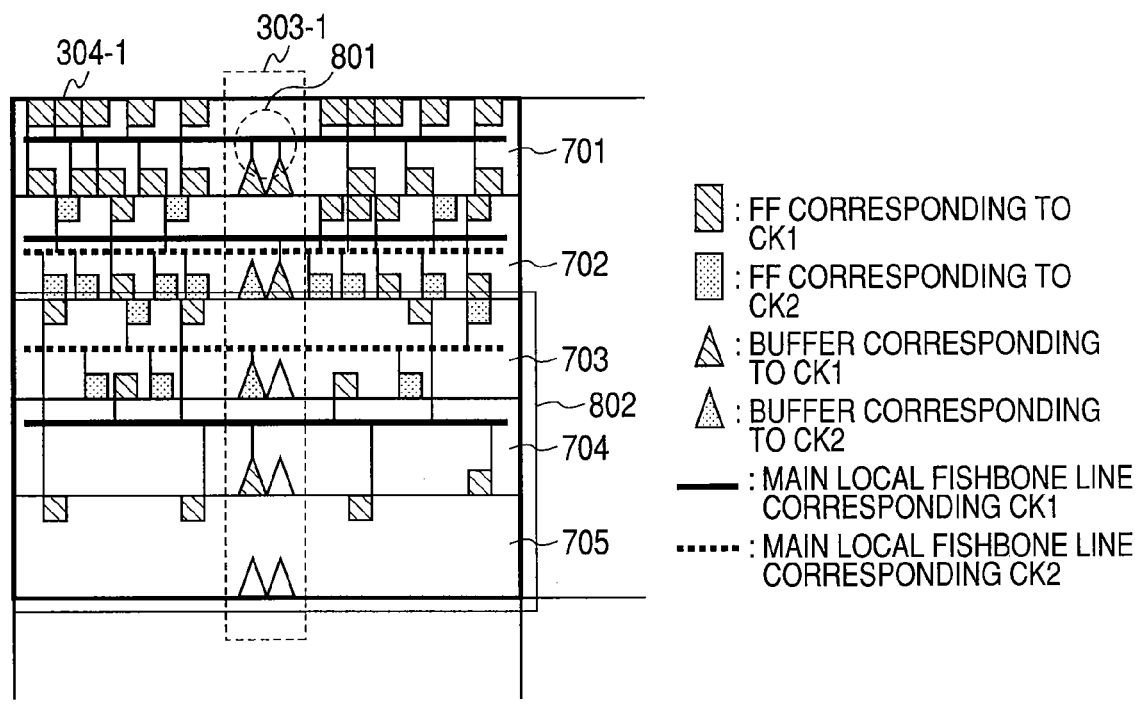
FIG. 8 shows a state where clock distribution is conducted to the flip-flops of FIG. 7 from the final stage clock buffer.

The sub-clock M2 classifies, after the automatic arrangement, the flip-flops distributed within a rectangular shape in which a vertical side is identical to a repetition interval of the sub-block (two ROWs in this example) for every clock required. In the example of FIG. 6, the flip-flops included in a rectangular shape 611 corresponding to the sub-block 601 is classified, while the flip-flops included in a rectangular shape 612 corresponding to the sub-block 602 and the flip-flops included in a rectangular shape 613 corresponding to the sub-block 603. The profiles of such classifications are shown in FIG. 7 in regard to the service area 304-1. A load capacity assuming the local fishbone structure as shown in FIG. 5 is respectively calculated for the rectangular shapes 701 to 705 to determined whether delay is within the target range or not. FIG. 8 shows an example of clock distribution. If a driving force of only one buffer is insufficient as the driving performance to be supplied to the flip-flops within the rectangular shape, outputs of the buffers belonging to the same sub-block are short-circuited (801). Here, it is no longer required to short-circuit buffer outputs of several sub-blocks, by determining a driving force of the buffer in view of acquiring sufficient driving performance even in the case where the flip-flops to which the identical clock is supplied are closely located within the rectangular shape with the initial arrangement. When excessive driving forces is obtained with only one buffer, adjacent rectangular shapes are integrated (802). The integrated rectangular shape 802 can be obtained by integrating the rectangular shapes 703 to 705 for the flip-flops corresponding to the clock CK1. On the occasion of integration of rectangular shapes, a couple of adjacent rectangular shapes classify the flip-flops to set the local fishbone main line and also implements calculation of delay in the case where the local fishbone main line is driven with the buffer nearest the main line. If the driving force of the nearest clock buffer is excessive, calculation of delay in drive in the case where the local fishbone main line within the region next nearest the main line is driven is implemented. The operations explained above are repeated until clock distribution to all flip-flops is completed. The final stage clock buffer not assigned to any clock is deleted to use the same clock buffer as the capacity cell and buffer region in the timing convergence process.

Since the flip-flops for receiving the clock CK1 are concentrated in the rectangular shape region 701, outputs of a couple of buffers are short-circuited (801) and the clock CK1 is distributed to the flip-flops in the rectangular shape region 701. Since the flip-flops for receiving the clock CK1 and the flip-flops for receiving the click CK2 are distributed almost equally in the rectangular shape region 702, the buffers in the rectangular shape region 702 are assigned one by one to the clock CK1 and clock CK2. Regarding the rectangular shape regions 703 to 705, since the clock supply capability is excessive respectively in the individual rectangular shape region for the flip-flop for receiving the clock CK1, integration of the rectangular shape regions is implemented (802). As a result of evaluation of delay explained previously, only one buffer of the rectangular shape region 703 is assigned to the clock CK1, while only one buffer of the rectangular shape region 704 to the clock CK2.

Since it is desirable that the main local fishbone line has a low resistance, it is also desirable to use a comparatively upper wiring layer among a plurality of wiring layers. Moreover, each main local fishbone line is arranged in the same wiring layer to provide equivalent capacity.

It explains the connection between the sub-block M2 (corresponding to the final stage clock buffer) and the sub-block M1 (corresponding to the clock buffer in the pre-final stage). Although, not shown in FIG. 7 and FIG. 8, the main clock line is arranged between the sub-block M1 and the sub-block M2 in the stage of initial arrangement but an output of the sub-block M1 and an input of the sub-block M2 are not connected. Here, sub-block M1 is also constituted with a buffer having a comparatively low driving force and sufficient driving force can be acquired by short-circuiting an output of the sub-block M1 even in the case where the buffer groups of the sub-block M2 that can be arranged within the service area 304-1 are assigned for the same clock.

Calculation of the necessary driving force of the sub-block M1 is conducted in the stage where clock distribution is completed and clock assignment to the final stage clock buffer is also completed and respective input and output are connected to the main clock line between the sub-block M1 and the sub-block M2.

Figure 9:
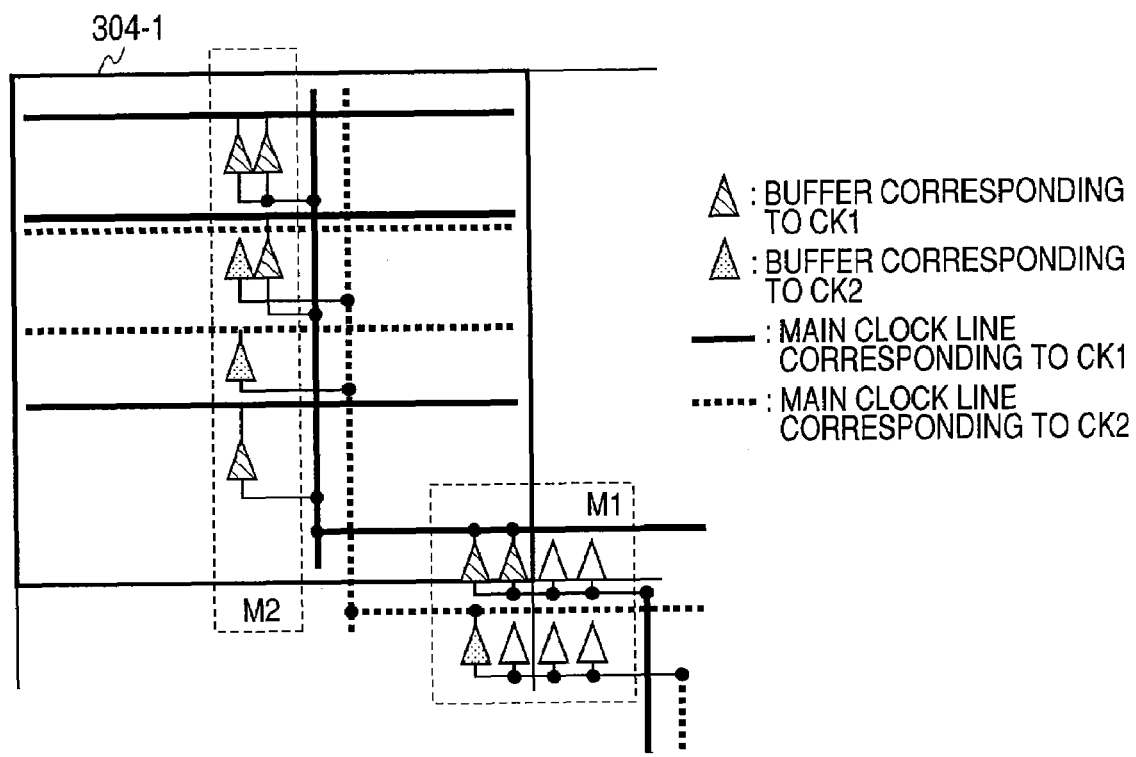
FIG. 9 shows a state where the final stage clock buffer is connected only to a clock buffer just preceding the final stage clock buffer.

FIG. 9 shows an example of the clock wiring between the sub-block M1 and the sub-block M2. Four buffers are assigned to the clock CK1, two buffers to the clock CK2, and the other clock buffers are deleted with the clock distribution process as the final stage clock buffers of the service area 304-1. The driving force required for the sub-block M1 is determined in accordance with the number of buffers forming the clock buffer of the final stage. In the example of FIG. 9, two buffers are assigned for the clock CK1 and only one buffer to the clock CK2. The buffer corresponding to two clocks CK1 is short-circuited to the main clock line corresponding to the clock CK1.

Since the clock buffer of the pre-final stage (namely, sub-block M1) is composed of the H tree in the initial arrangement, load capacity must be maintained to a constant value. Therefore, unused buffers of the sub-block M1 are not deleted and an output is kept opened. Moreover, the output of the sub-block M2 is connected to the main local fishbone line used when the clock distribution process has been determined. Moreover, the main local fishbone line is wired with the flip-flop using an automatic wiring tool but since the main line is embedded, detouring potential is minimized and the target clock skew can be obtained.

Figure 10A:
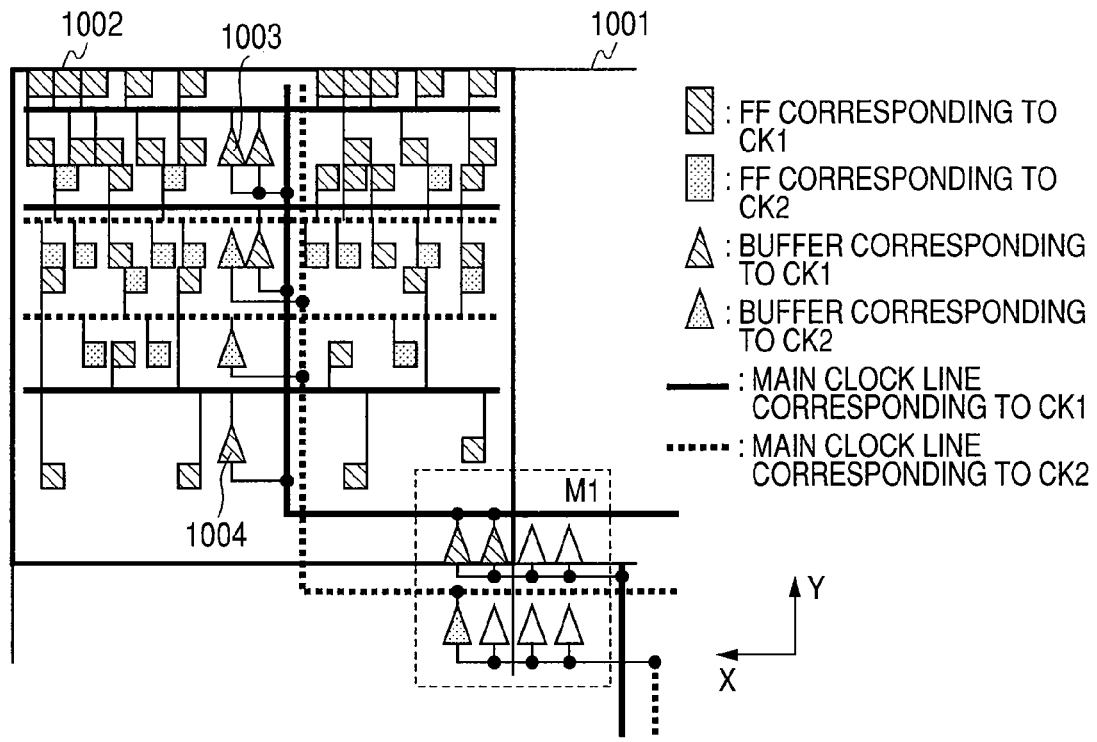
FIG. 10A shows a semiconductor device including the clock distribution circuit of the present invention.
Figure 10B:
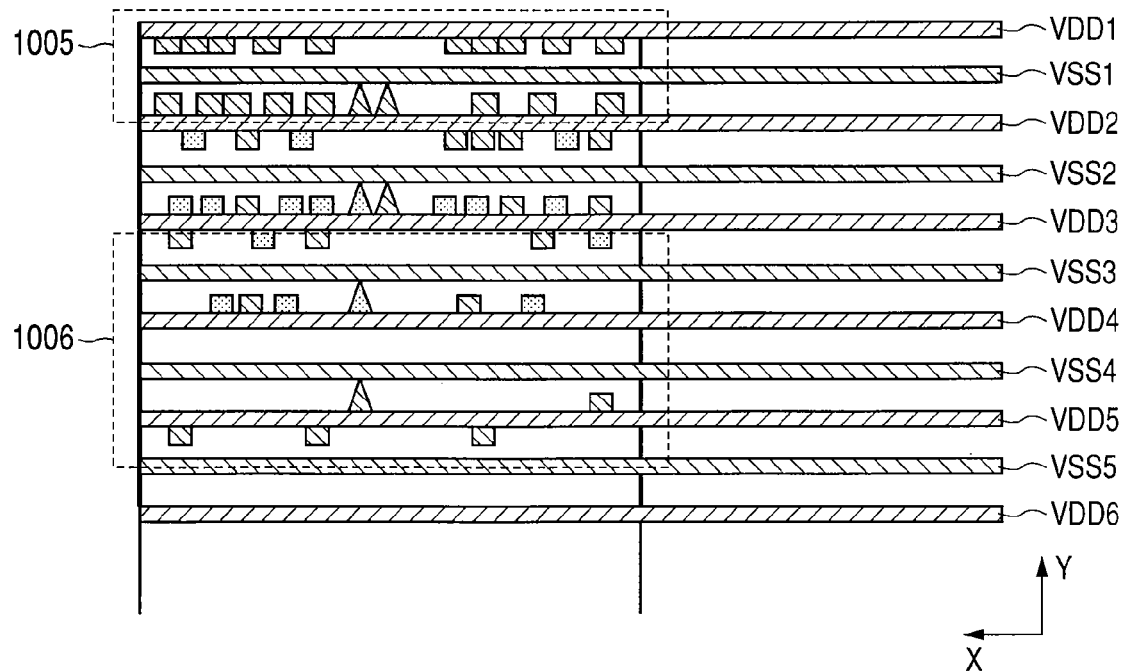
FIG. 10B shows a state of arrangement of a main power supply line in the present invention.

FIGS. 10A and 10B show a semiconductor device 1001 having a clock distribution circuit that can be obtained with a method for designing the clock distribution circuit explained above. FIG. 10A shows the clock distribution circuit. The H tree type clock distribution circuit is constituted up to the clock buffer of the second last stage and the final stage clock buffer is constituted as the local fishbone type clock distribution circuit. The region 1002 is the service area where the final stage clock buffer supplies the clock. Meanwhile, FIG. 10B shows a main power supply line (metal wire) of the lowest layer. As shown in FIG. 6, the power supply line is used in common with the adjacent cells in the Y direction, but the cells are indicated small for alignment with FIG. 10A. As shown in FIG. 10A and FIG. 10B, the main local fishbone line of the present invention does not correspond to the cell arrangement allowable row. For example, the main clock line (main local fishbone line) connected with the buffer 1003 supplies the clock to the flip-flops arranged in a couple of cell arrangement allowable rows (refer to 1005 in FIG. 10B). On the other hand, the main clock line (main local fishbone line) connected with the buffer 1004 supplies the clock to the flip-flops arranged in the four cell arrangement allowable rows (refer to 1006 in FIG. 10B). As explained above, the number of cell arrangement allowable rows of the flip-flops connected with the main clock line is not constant. This means that fluctuation in interval of the adjacent main clock lines in a plurality of main clock lines becomes larger than that in the interval of the adjacent main power supply lines.

Figure 11:
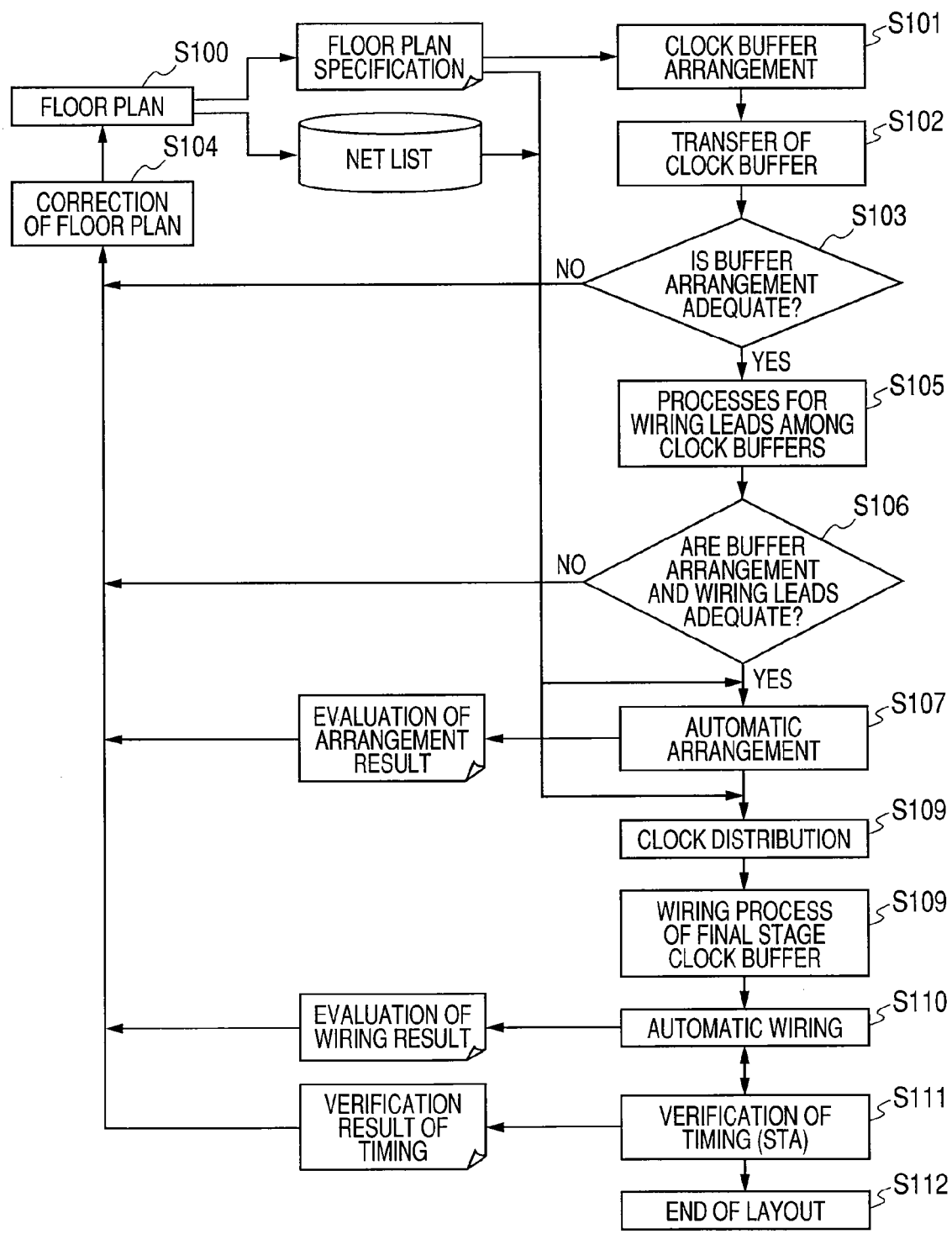
FIG. 11 shows a design flow of the semiconductor device of the present invention.

FIG. 11 shows a design flowchart of the semiconductor device of the present invention. After the floor plan (S100), arrangement of clock buffers is conducted (S101). When clock buffer arrangement overlaps with a macro-cell, arrangement is transferred to provide the equal delay and equal skew from a virtual wire length (S102). If transfer result is lower than the target performance, the floor plan is reviewed (S104). After determination of clock buffer arrangement, wiring is conducted among the clock buffers (S105). Wiring between the clock buffers is designed to provide a constant wiring resistance by providing a shield wire in both sides thereof. In this stage, a main wire is laid but connection is not conducted between the clock buffers of the final stage and the pre-final stage. Clock skew is estimated again on the basis of the capacitance value of the real wires. When the target is not yet satisfied, re-wiring or re-arrangement is conducted. When the target is attained, the automatic arrangement process is conducted to determine all arrangements of the LSI structure cell (S107). The clock distribution process is conducted on the basis of the flip-flop arrangement information to determine sharing of the clock buffers of the final stage and the pre-final stage (S108). In this case, unwanted final stage clock buffer is deleted as required. After connections of the main clocks between the clock buffers of the final stage and the pre-final stage and addition of the main local fishbone lines (S109), the automatic wiring process is conducted (S110). After the automatic wiring process, timing analysis process by STA is executed (S112).

What is claimed is:

1. A semiconductor device including a plurality of metal wiring layers, comprising:

a clock distribution circuit including a plurality of main clock lines connected to any of a plurality of buffers forming the final stage clock buffers and a plurality of final stage buffers; and a plurality of flip-flops for receiving a clock from any line of the plurality of main clock lines, wherein the plurality of main clock lines are extended in a first direction, wherein the first direction is identical to the direction where a main power supply line of the lowest layer formed on the metal wiring layer is extended, wherein a cell arrangement allowable row is defined with an adjacent main power supply line, wherein the plurality of main clock lines include a first main clock line and a second main clock line, and wherein the number of cell arrangement allowable rows where a plurality of first flip-flops for receiving the clock from the first main clock line are located is different from the number of cell arrangement allowable rows where the plurality of first flip-flops for receiving the clock from the second main clock line are located.

2. The semiconductor device according to claim 1, wherein the first main clock line is located at the gravity point of distribution in a second direction orthogonally crossing a first direction of the plurality of first flip-flops, and wherein the second main clock line is located at the gravity point of distribution in the second direction of the plurality of second flip-flops.

3. The semiconductor device according to claim 1, wherein the clock distribution circuit includes an H tree structure formed of clock buffers including an initial stage clock buffer and the pre-final stage clock buffer.

4. The semiconductor device according to claim 1, wherein a plurality of buffers are arranged as the pre-final stage clock buffers, and wherein the plurality of buffers arranged as the pre-final stage clock buffers include the buffers not connected to the main clock line for connecting the final stage clock buffers and the pre-final stage clock buffers.

5. The semiconductor device according to claim 1, comprising the main clock line connected to the buffers forming the final stage clock buffers.

6. A semiconductor device having a plurality of metal wiring layers, comprising:

a clock distribution circuit including a plurality of main clock lines connected to any buffer of a plurality of buffers forming the final stage clock buffers and the final stage buffers; and a plurality of flip-flops for receiving a clock from any line of a plurality of main clock lines, wherein the plurality of main clock lines are extended in a first direction, wherein the first direction is identical to the direction where a main power supply line of the lowest layer formed on the metal wiring layer is extended, and wherein fluctuation in interval of the adjacent main clock lines in the plurality of main clock lines is larger than that in interval of the adjacent main power supply lines.

7. The semiconductor device according to claim 1, wherein the plurality of main clock lines include the first main clock line and the second main clock line, wherein the first main clock line supplies the clock to the plurality of first flip-flops, wherein the second main clock line supplies the clock to the plurality of second flip-flops, wherein the first main clock line is located at the gravity point of distribution in the second direction orthogonally crossing the first direction of the plurality of first flip-flops, and wherein the second main clock line is located at the gravity point of distribution in the second direction of the plurality of second flip-flops.

8. The semiconductor device according to claim 7, wherein the clock distribution circuit has the plurality of clock buffers including the initial stage clock buffer and the final stage clock buffer forming the H tree structure.

9. The semiconductor device according to claim 7, wherein a plurality of clock buffers are arranged as the pre-final stage clock buffers, and the plurality of buffers arranged as the pre-final stage clock buffers include the buffers not connected to the main clock line for connecting the final stage clock buffers and the pre-final stage clock buffers.

10. The semiconductor device according to claim 7, including the main clock line connected to the buffers forming the final stage clock buffers.

\* \* \* \* \*